United States Patent
Cozma et al.

(10) Patent No.: US 12,166,773 B2
(45) Date of Patent: Dec. 10, 2024

(54) DETECTING IDENTITY THEFT OR IDENTITY CHANGE IN MANAGED SYSTEMS

(71) Applicant: Lenovo Enterprise Solutions (Singapore) Pte. Ltd., New Tech Park (SG)

(72) Inventors: Alexandru Cozma, Bucharest (RO); Jeffery J Van Heuklon, Rochester, MN (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 251 days.

(21) Appl. No.: 17/957,782

(22) Filed: Sep. 30, 2022

(65) Prior Publication Data

US 2024/0114039 A1 Apr. 4, 2024

(51) Int. Cl.
*H04L 9/40* (2022.01)

(52) U.S. Cl.
CPC ...... *H04L 63/1416* (2013.01); *H04L 63/0823* (2013.01); *H04L 63/0876* (2013.01)

(58) Field of Classification Search
CPC ............. H04L 63/0823; H04L 63/0876; H04L 63/1416; H04L 61/00; H04L 61/45; H04L 61/4552; H04L 61/4553; H04L 9/3273; H04L 9/3271; H04L 9/3268; G06F 21/445; G06F 21/572; G06F 21/575; G06F 21/577; G06F 21/73
See application file for complete search history.

(56) References Cited

U.S. PATENT DOCUMENTS

| | | | | |
|---|---|---|---|---|
| 6,823,454 B1 * | 11/2004 | Hind | ................... | H04L 61/4511 713/168 |
| 6,826,690 B1 * | 11/2004 | Hind | ...................... | G06F 21/31 713/176 |
| 7,240,364 B1 * | 7/2007 | Branscomb | ......... | H04L 61/4541 726/5 |

(Continued)

OTHER PUBLICATIONS

Keys, "IP Alias Resolution Techniques", CAIDA, San Diego Supercomputer Center, University of California San Diego, Dec. 2008, pp. 1-7.

(Continued)

*Primary Examiner* — Greg C Bengzon
(74) *Attorney, Agent, or Firm* — Kunzler Bean & Adamson; Bruce R. Needham

(57) ABSTRACT

A method for detecting identity theft or identity change in managed computing systems is disclosed. An apparatus and computer program product also perform the functions of the method. The method includes identifying that a unique identifier of a first computing device assigned a first IP address matches a unique identifier of a second computing device assigned a second IP address and, in response to identifying that the unique identifier of the first computing device matches the unique identifier of the second computing device, sending a test message to the first computing device using the first IP address. The method includes sending an alert of a possible malicious event in response to receiving a response to the test message and sending an alert of a possible misconfiguration in response to a failure to receive a response to the test message.

16 Claims, 5 Drawing Sheets

(56) References Cited

U.S. PATENT DOCUMENTS

| | | | | |
|---|---|---|---|---|
| 7,562,390 | B1* | 7/2009 | Kwan | H04L 63/0236 |
| | | | | 726/23 |
| 7,631,064 | B1* | 12/2009 | Gray | H04L 43/0817 |
| | | | | 709/227 |
| 9,444,839 | B1* | 9/2016 | Faulkner | H04L 63/1425 |
| 9,800,589 | B1* | 10/2017 | Asveren | H04L 63/1408 |
| 9,853,968 | B2* | 12/2017 | Shen | H04L 63/0838 |
| 10,375,103 | B1* | 8/2019 | Brandwine | H04L 63/0236 |
| 10,382,401 | B1* | 8/2019 | Lee | H04L 63/166 |
| 10,484,334 | B1* | 11/2019 | Lee | H04L 67/30 |
| 10,972,503 | B1* | 4/2021 | Mohan | H04L 63/14 |
| 2007/0174472 | A1* | 7/2007 | Kulakowski | H04L 63/1466 |
| | | | | 709/229 |
| 2010/0248720 | A1* | 9/2010 | Millet | H04W 12/069 |
| | | | | 455/435.1 |
| 2010/0274859 | A1* | 10/2010 | Bucuk | H04L 63/08 |
| | | | | 709/248 |
| 2010/0332829 | A1* | 12/2010 | Baroffio | H04N 7/162 |
| | | | | 713/168 |
| 2013/0179548 | A1* | 7/2013 | Singh | G06F 8/61 |
| | | | | 709/220 |
| 2013/0262937 | A1* | 10/2013 | Sridharan | G06F 11/0709 |
| | | | | 370/242 |
| 2016/0105317 | A1* | 4/2016 | Zimmermann | H04L 41/0893 |
| | | | | 709/221 |
| 2016/0294646 | A1* | 10/2016 | Kirner | H04L 41/0893 |
| 2017/0093910 | A1* | 3/2017 | Gukal | H04L 63/1491 |
| 2017/0223054 | A1* | 8/2017 | Wing | H04L 63/0281 |
| 2017/0272950 | A1* | 9/2017 | Venkataramanachari | |
| | | | | H04W 12/082 |
| 2017/0289139 | A1* | 10/2017 | Guo | H04L 9/40 |
| 2018/0006839 | A1* | 1/2018 | Juneau | H04L 12/22 |
| 2018/0091528 | A1* | 3/2018 | Shahbaz | G06F 21/53 |
| 2019/0327125 | A1* | 10/2019 | McChord | H04L 69/18 |
| 2020/0077265 | A1* | 3/2020 | Singh | H04L 63/0272 |
| 2020/0280534 | A1* | 9/2020 | Rajendran | H04L 61/103 |
| 2020/0404502 | A1* | 12/2020 | Trivellato | H04W 48/16 |
| 2021/0019447 | A1* | 1/2021 | Ayoub | G06F 21/44 |
| 2021/0377210 | A1* | 12/2021 | Singh | H04L 67/125 |
| 2021/0377299 | A1* | 12/2021 | Kaliyamoorthy | H04L 63/1416 |
| 2021/0409450 | A1* | 12/2021 | Hansalia | H04L 63/20 |
| 2022/0006823 | A1* | 1/2022 | Tse | H04L 41/0813 |
| 2022/0150220 | A1* | 5/2022 | Verheyen | H04L 63/045 |
| 2022/0329604 | A1* | 10/2022 | Guy | H04L 63/102 |
| 2022/0417096 | A1* | 12/2022 | Vutukuri | H04L 43/0829 |
| 2022/0417241 | A1* | 12/2022 | Zilbershtein | H04L 9/3247 |
| 2023/0019180 | A1* | 1/2023 | de Nijs | G06F 21/577 |
| 2024/0126538 | A1* | 4/2024 | Koval | G06F 9/4401 |

OTHER PUBLICATIONS

"Control Network Access Using Device Identity Authentication", Juniper Networks, Junos OS Authentication and Integrated User Firewalls User Guide, Jan. 20, 2021, pp. 1-30.

* cited by examiner

DETECTING IDENTITY THEFT OR IDENTITY CHANGE IN MANAGED SYSTEMS

FIELD

The subject matter disclosed herein relates to managed computer systems and more particularly relates to detecting identity theft or identity change in managed computing systems.

BACKGROUND

In management solutions, the managed entities are identified by a hostname or an internet protocol ("IP") address, but the communication in the end happens using the IP address. The IP address stands as a unique identifier in many cases and is usually controlled by the system administrator. Any changes to the IP address must typically be done by the system administrator, otherwise the change could be a possible mistake or even an attack.

BRIEF SUMMARY

A method for detecting identity theft or identity change in managed computing systems includes identifying that a unique identifier of a first computing device assigned a first IP address matches a unique identifier of a second computing device assigned a second IP address and, in response to identifying that the unique identifier of the first computing device matches the unique identifier of the second computing device, sending a test message to the first computing device using the first IP address. The method includes sending an alert of a possible malicious event in response to receiving a response to the test message and sending an alert of a possible misconfiguration in response to a failure to receive a response to the test message. An apparatus and computer program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
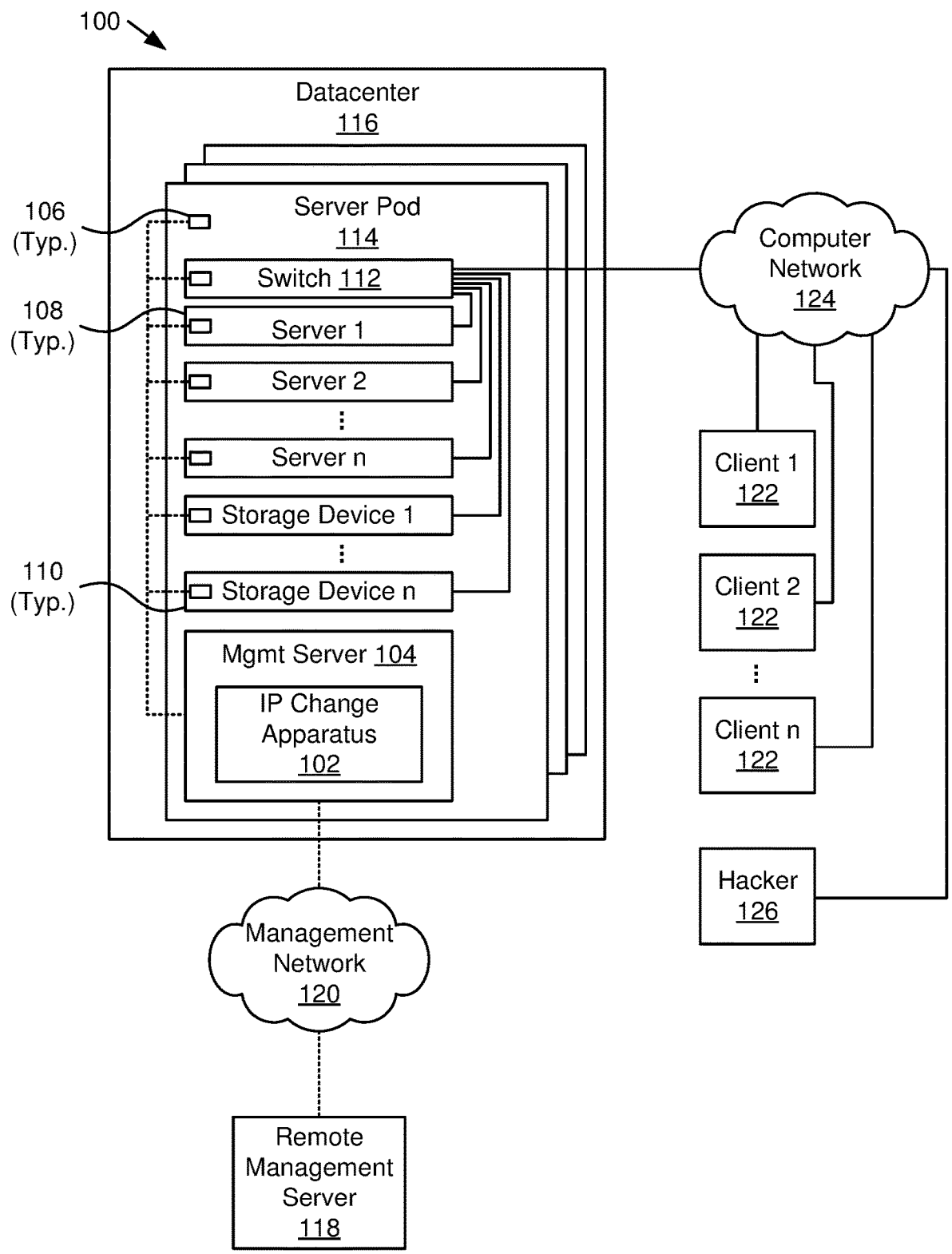
FIG. 1 is a schematic block diagram illustrating a system for detecting identity theft or identity change in managed computing systems, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R. Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C." includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A method for detecting identity theft or identity change in managed computing systems includes identifying that a unique identifier of a first computing device assigned a first IP address matches a unique identifier of a second computing device assigned a second IP address and, in response to identifying that the unique identifier of the first computing device matches the unique identifier of the second computing device, sending a test message to the first computing device using the first IP address. The method includes sending an alert of a possible malicious event in response to receiving a response to the test message and sending an alert of a possible misconfiguration in response to a failure to receive a response to the test message.

In some embodiments, the method includes determining that the second computing device is the first computing device and removing the first IP address being assigned to the first computing device in response to receiving confirmation from a user that the first computing device is assigned the second IP address. In other embodiments, the method includes in response to a failure to receive a response to the test message, determining whether a digital certificate of the second computing device matches a digital certificate of the first computing device, and in response to determining that the digital certificate of the second computing device does not match the digital certificate for the first computing device, sending an alert of a possible malicious event.

In other embodiments, the method includes, in response to determining that the digital certificate of the second computing device matches the digital certificate for the first computing device, determining whether credentials of the second computing device match credentials of the first computing device, and in response to determining that credentials of the second computing device do not match credentials of the first computing device, sending an alert warning of a malicious event regarding the second computing device. In other embodiments, the method includes, in response to determining that credentials of the second computing device match credentials of the first computing device, sending an alert of a possible misconfiguration, and determining that the second computing device is the first computing device and removing the first IP address being assigned to the first computing device in response to receiving confirmation from a user that the first computing device is assigned the second IP address. In other embodiments, the credentials of the first computing device and the credentials of the second computing device each include an identifier and a corresponding password.

In some embodiments, identifying that the unique identifier of the first computing device matches the unique identifier of the second computing device includes comparing a serial number of the second computing device with a serial number of the first computing device and/or comparing a universal unique identifier ("UUID") of the second computing device with a UUID of the first computing device. In other embodiments, the possible malicious event includes a cloning of the first computing device for malicious purposes.

An apparatus for detecting identity theft or identity change in managed computing systems includes a processor, and non-transitory computer readable storage media storing code. The code is executable by the processor to perform operations that include identifying that a unique identifier of a first computing device assigned a first IP address matches a unique identifier of a second computing device assigned a second IP address, and in response to identifying that the unique identifier of the first computing device matches the unique identifier of the second computing device, sending a test message to the first computing device using the first IP address. The operations include sending an alert of a possible malicious event in response to receiving a response to the test message and sending an alert of a possible misconfiguration in response to a failure to receive a response to the test message.

In some embodiments, the operations include determining that the second computing device is the first computing device and removing the first IP address being assigned to the first computing device in response to receiving confirmation from a user that the first computing device is assigned the second IP address. In other embodiments, the operations include, in response to a failure to receive a response to the test message, determining whether a digital certificate of the second computing device matches a digital certificate of the first computing device, and in response to determining that the digital certificate of the second computing device does not match the digital certificate for the first computing device, sending an alert of a possible malicious event.

In other embodiments, the operations include, in response to determining that the digital certificate of the second computing device matches the digital certificate for the first computing device, determining whether credentials of the second computing device match credentials of the first computing device, and in response to determining that credentials of the second computing device do not match credentials of the first computing device, sending an alert warning of a malicious event regarding the second computing device.

In other embodiments, the operations include, in response to determining that credentials of the second computing device match credentials of the first computing device, sending an alert of a possible misconfiguration, and determining that the second computing device is the first computing device and removing the first IP address being assigned to the first computing device in response to receiving confirmation from a user that the first computing device is assigned the second IP address. In other embodiments, identifying that the unique identifier of the first computing device matches the unique identifier of the second computing device includes comparing a serial number of the second computing device with a serial number of the first computing device, and/or comparing a UUID of the second computing device with a UUID of the first computing device.

A program product for detecting identity theft or identity change in managed computing systems includes a non-transitory computer readable storage medium storing code. The code is configured to be executable by a processor to perform operations that include identifying that a unique identifier of a first computing device assigned a first IP address matches a unique identifier of a second computing device assigned a second IP address, and in response to identifying that the unique identifier of the first computing device matches the unique identifier of the second computing device, sending a test message to the first computing device using the first IP address. The operations include sending an alert of a possible malicious event in response to receiving a response to the test message and sending an alert of a possible misconfiguration in response to a failure to receive a response to the test message.

In some embodiments, the operations include determining that the second computing device is the first computing device and removing the first IP address being assigned to the first computing device in response to receiving confirmation from a user that the first computing device is assigned the second IP address. In other embodiments, the operations include, in response to a failure to receive a response to the test message, determining whether a digital certificate of the second computing device matches a digital certificate of the first computing device, and in response to determining that the digital certificate of the second computing device does not match the digital certificate for the first computing device, sending an alert of a possible malicious event.

In some embodiments, the operations include, in response to determining that the digital certificate of the second computing device matches the digital certificate for the first computing device, determining whether credentials of the second computing device match credentials of the first computing device, and in response to determining that credentials of the second computing device do not match credentials of the first computing device, sending an alert warning of a malicious event regarding the second computing device. In other embodiments, the operations include, in response to determining that credentials of the second computing device match credentials of the first computing device, sending an alert of a possible misconfiguration, and determining that the second computing device is the first computing device and removing the first IP address being assigned to the first computing device in response to receiving confirmation from a user that the first computing device is assigned the second IP address.

In some embodiments, identifying that the unique identifier of the first computing device matches the unique identifier of the second computing device includes comparing a serial number of the second computing device with a serial number of the first computing device, and/or comparing a UUID of the second computing device with a UUID of the first computing device.

FIG. 1 is a schematic block diagram illustrating a system 100 for detecting identity theft or identity change in managed computing systems, according to various embodiments. The system includes an IP change apparatus 102 in a management server 104 of a server pod 114 of a datacenter 116. Each server pod 114 includes a management controller 106 in each of servers 108, storage devices 110, switches 112, and other computing devices in the datacenter 116.

A management controller 106, which may be called a baseboard management controller ("BMC"), provides access to computing devices of the datacenter 116 through the management server 104. One example of a management controller 106 is a Lenovo® XClarity® Controller ("XCC"). The datacenter 116 includes one or more management servers 104 in communication with the management controllers 106 located in the various computing devices of the datacenter 116.

Typically, the management controller 106 is connected to an internal and external management network 120 separate from a computer network used by virtual machines ("VMs"), containers, servers 108, etc. for communications, workloads, etc. The management controllers 106 typically have access to various components of the servers 108 and are able to control the components, report alerts and other data from the components and manage the components. In some embodiments, a management controller 106 is able to access components of the server 108 when the server 108 is not running and is often able to reboot the server 108.

In some embodiments, the management controllers 106 of the servers 108, storage devices 110, etc. are connected to a management server 104 that acts as a gateway for external communications. The management server 104, in some embodiments, is a Lenovo XClarity Administrator ("LXCA"). In some embodiments, the management server 104 is accessible over a private and/or secure connection. In some embodiments, a system administrator is able to access the management server 104 via virtual private network ("VPN") over a public computer network, such as the Internet. In other embodiments, the secure connection between the management server 104 and other devices, such as the remote management server 118, is implemented using another secure communications protocol.

The remote management server 118 includes a management portal that receives data from the management server 104. Typically, the management portal receives data from the management server 104 over a secured connection, such as a VPN. The management portal, in some embodiments, interacts with hardware of the remote management server 118, such as a network interface card ("NIC") for receiving or importing data from the management server 104. In some embodiments, the management portal is running on a processor of the remote management server 118. In some embodiments, the remote management server 118 is a Lenovo® XClarity® Orchestrator ("LXCO"). In other embodiments, the remote management server 118 is from another vendor.

In various embodiments, management data is transmitted over the management network 120 and other data is transmitted over the computer network 124. In some embodiments, the management network 120 and computer network 124 include a LAN, a WAN, a fiber network, a wireless connection, the Internet, and the like. In some embodiments, the management network 120 and computer network 124 include multiple networks, which may include private networks and/or public networks.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

Clients 122 and other computing devices, such a computer of a hacker 126 communicate with the servers 108 of the datacenter 116 over the computer network 124 using internet protocol ("IP") addresses. Typically, the servers 108, storage devices 110, switches 112, etc. of the datacenter 116 each have an IP address, which are typically behind a firewall at a gateway router to the datacenter 116 and the datacenter 116 includes an internal local area network (not shown). The IP addresses of the servers 108, storage devices 110, switches 112, etc. of the datacenter 116 are often part of a subnet. The clients 122/hacker 126 communicate with the servers 108 using IP addresses and other identifiers such that the gateway router is able to direct traffic to the servers 108.

While the firewall includes systems to help prevent a hacker 126 from gaining access to computing devices of the datacenter 116, hackers 126 do manage to gain access to the computing devices. For example, a hacker 126 may get access to a server 108 and may then clone information about the server 108, such as a serial number, a universal unique identifier ("UUID"), etc. and associating the serial number, UUID, etc. of the server 108 with a second IP address. Information meant for the server 108 may then be mistakenly directed to the second IP address and the hacker 126 then receives information intended for the server 108.

Typically, the management server 104 or other device in the system 100 keeps track of IP addresses and associated computing devices in a routing table or similar data structure where an IP address is associated with identifying information of the associated computing devices, such as the serial number, UUID, or other unique parameter. The management server 104 typically sends out a discovery message periodically to identify which computing devices are connected to the network. Where a hacker 126 clones a computing device, the management server 104 may then add the cloned computing device, including the new IP address and unique identifiers being sent from the new IP address, which are the same unique identifiers as the computing device that was cloned, to the routing table. Currently, the cloned computing device is able to remain in the system 100 receiving data or seeking out data until there are communication errors due to some messages going to cloned computing device instead of the intended computing device that was cloned.

However, a computing device may also be assigned a different IP address on purpose. For example, the computing device may be moved to a different location that requires a new IP address. One of skill in the art will recognize other reasons to change an IP address of a computing device. When the current IP address is changed to a new IP address, the routing table may not be updated to remove the existing IP address, which also then may cause communication errors.

The IP change apparatus 102 provides a solution to identify that there is a computing device with two IP addresses and takes steps to send alerts of a possible malicious event, such as a hacker 126 cloning a computing device, or sends an alert of a possible misconfiguration. Both messages alert a system administrator, a remote management server 118, etc. of a problem to be resolved. In the case of a misconfiguration, the IP change apparatus 102 provides a mechanism to update the routing table or other data structure so that there is only a single IP address assigned to a computing device.

In some embodiments, the IP change apparatus 102 identifies that a unique identifier of a first computing device assigned a first IP address matches a unique identifier of a second computing device assigned a second IP address and then sends out a test message (e.g., ping) to the first IP address. If the IP change apparatus 102 receives a response to the test message, the IP change apparatus 102 sends out a malicious event alert. If the IP change apparatus 102 does receive a response, the first computing device may still be responding to messages to the first IP address while the second computing device is a cloned computing device that includes unique identifiers of the first computing device while the second computing device receives messages through the second IP address. If the IP change apparatus 102 does not receive a response to the ping, the IP change apparatus 102 sends out a misconfiguration alert. Not receiving a response may be indicative of the first computing device being the same as the second computing device, but the first IP address is no longer functioning, indicative of a misconfiguration. The IP change apparatus 102 is described in more detail with regard to the apparatuses 200, 300 of FIGS. 2 and 3.

While the system 100 is depicted as a datacenter 116, the IP change apparatus 102 is also applicable in any computing system with central management capable of receiving and responding to alerts of possible malicious activity or alerts of a possible misconfiguration. For example, the IP change apparatus 102 may be used in an office environment with an information technology ("IT") person with access to computing device of the computing devices of the office either over a dedicated management network or over computer network 124 using management software. The IP change apparatus 102 may be located in a computer accessed by a system administrator, a computer where system software is running, etc. One of skill in the art will recognize other environments where the IP change apparatus 102 may be used.

Figure 2:
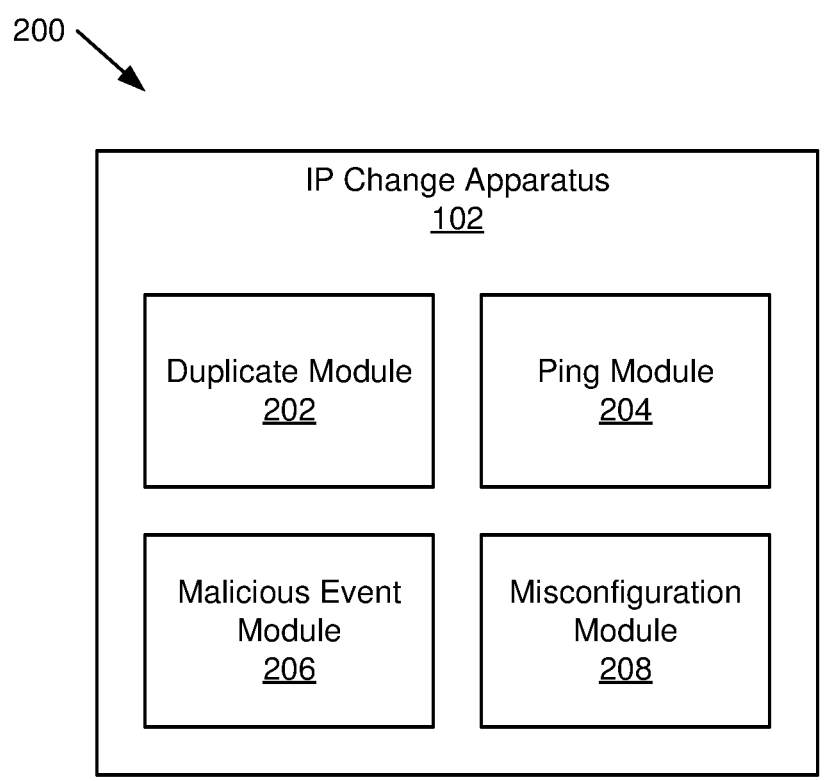
FIG. 2 is a schematic block diagram illustrating an apparatus for detecting identity theft or identity change in managed computing systems, according to various embodiments.

FIG. 2 is a schematic block diagram illustrating an apparatus 200 for detecting identity theft or identity change in managed computing systems, according to various embodiments. The apparatus 200 includes an IP change apparatus 102 that includes a duplicate module 202, a ping module 204, a malicious event module 206, and a misconfiguration module 208, which are described below.

While the apparatus 200 is depicted in the management server 104 in FIG. 1, some or all of the apparatus 200 may be locate elsewhere, such as in the management controllers 106, the remote management server 118, a pod management server, or the like. In some embodiments, the apparatus 200 is implemented as code stored on a computer readable storage device, which is non-transitory. The computer readable storage device may include volatile memory or non-volatile memory. For example, the code may be stored on one or more computer readable storage devices in the form of hard disk drives, solid state storage, etc. and portions may be loaded into RAM for execution on a processor. In other embodiment, the apparatus 200 is implemented using other devices, such as a programmable hardware device. One of skill in the art will recognize other ways of implementing the apparatus 200 in a computing system 100 or computing device.

The apparatus 200 includes a duplicate module 202 configured to identify that a unique identifier of a first computing device assigned a first IP address matches a unique identifier of a second computing device assigned a second IP address. In some examples, the first computing device is a server 108, a storage device 110, a switch 112, or other computing device that communicates with other computing devices using an IP address. For example, the first computing device may be a server 108 that may be a target of a hacker 126 or possibly has been assigned a new IP address by a system administrator.

Each computing device of the system 100 typically includes a serial number, a UUID, or both. In addition, each computing device of the system 100 may also include a media access control ("MAC") address for each port of the computing device. While MAC addresses are unique for a computing device, MAC addresses may also change while serial numbers and UUIDs remain with the computing device. In addition, the computing devices are typically certified as authentic and are given a digital certificate by a trusted certificate authority ("CA"). The computing devices may also include credentials in the form of a username and password.

The management server 104 or other server in the system 100, in some embodiments, uses a discovery protocol on a periodic basis to determine which devices are connected to a computer network internal to the datacenter 116. In some embodiments, the discovery protocol is Simple Service Discovery Protocol ("SSDP"), which is a network protocol based on the Internet protocol suite for advertisement and discovery of network services and presence information. SSDP typically functions without assistance of server-based configuration mechanisms, such as Dynamic Host Configuration Protocol ("DHCP") or Domain Name System ("DNS"), and without special static configuration of a network host. SSDP is used for Universal Plug and Play ("UPnP") and is often used in residential or small office environments.

In other embodiments, the management server 104 uses Service Location Protocol ("SLP") to determine which computing devices are connected. SLP is a service discovery protocol that allows computers and other computing devices to find services in a local area network without prior configuration. SLP was designed to scale from small, unmanaged networks to large enterprise networks. SLP is used by computing devices to announce services on a local computer network. Each service includes a URL that is used to locate the service. Additionally, SLP may have name/value pairs, called attributes. In other embodiments, the management server 104 uses another discovery protocol.

In some embodiments, the IP change apparatus 102 uses results from an existing discovery service running in the system 100. In other embodiments, the IP change apparatus 102 initiates discovery using a discovery service, as described with regard to the apparatus 300 of FIG. 3. Through discovery, once the first device with the first IP address and the second device with the second IP address are discovered where one or more unique identifiers of the first device and the second device are the same, the duplicate module 202 identifies that a unique identifier of a first computing device assigned a first IP address matches a unique identifier of a second computing device assigned a second IP address.

The apparatus 200 includes a ping module 204 that sends a test message to the first computing device using the first IP address in response to the duplicate module 202 identifying that the unique identifier of the first computing device matches the unique identifier of the second computing device. In some embodiments, the test message is called a ping, which is a discovery message seeking to get a response from a device. In some embodiments, the test message is configured to have the first computing device respond with information indicating that the first computing device is present on the computer network of the datacenter 116 and is able to respond.

In some embodiments, the ping module 204 determines whether or not a response to the test message from the first computing device has been received. In some embodiments, the ping module 204 determines that a response has been received by receiving a response that meets certain criteria, such as being received prior to a timeout, verifying that contents of the response are appropriate based on the test message, etc. For example, a valid response may include a unique identifier of the first computing device, data indicating status of the first computing device, etc. The ping module 204, in some embodiments, determines that a response to the test message has not been received based on a response not being received prior to a timeout, based on information in a response not being what is expected, etc.

Receiving or not receiving a response to the test message typically has multiple significances. Where no response is received, one possibility is that the first computing device is the same as the second computing device and that the IP address of this first/second computing device has changed from the first IP address to the second IP address. Where a response is received based on the test message, because there is an extremely low probability that two devices have been assigned the same unique identifiers, there is a possibility that a hacker 126 has cloned the first computing device and assigned the unique identifiers of the first computing device to the second IP address creating an illusion of a second computing device. With the system 100 having two computing devices with the same unique identifiers, some data packets intended for the first computing device will be sent to this second computing device using the second IP address.

The apparatus 200 includes a malicious event module 206 configured to send an alert of a possible malicious event in response to the ping module 204 receiving a response to the test message, and a misconfiguration module 208 configured to send an alert of a possible misconfiguration in response the ping module 204 determining that there is a failure to receive a response to the test message. In some embodiments, the alerts from the malicious event module 206 and the misconfiguration module 208 are sent to a system administrator. In other embodiments, the alerts are sent to an email address, mobile computing device, or the like. In other embodiments, the alerts are sent to a remote management server 118, which then forwards the alerts to a system administrator or to an application that takes action based on the alerts.

Figure 3:
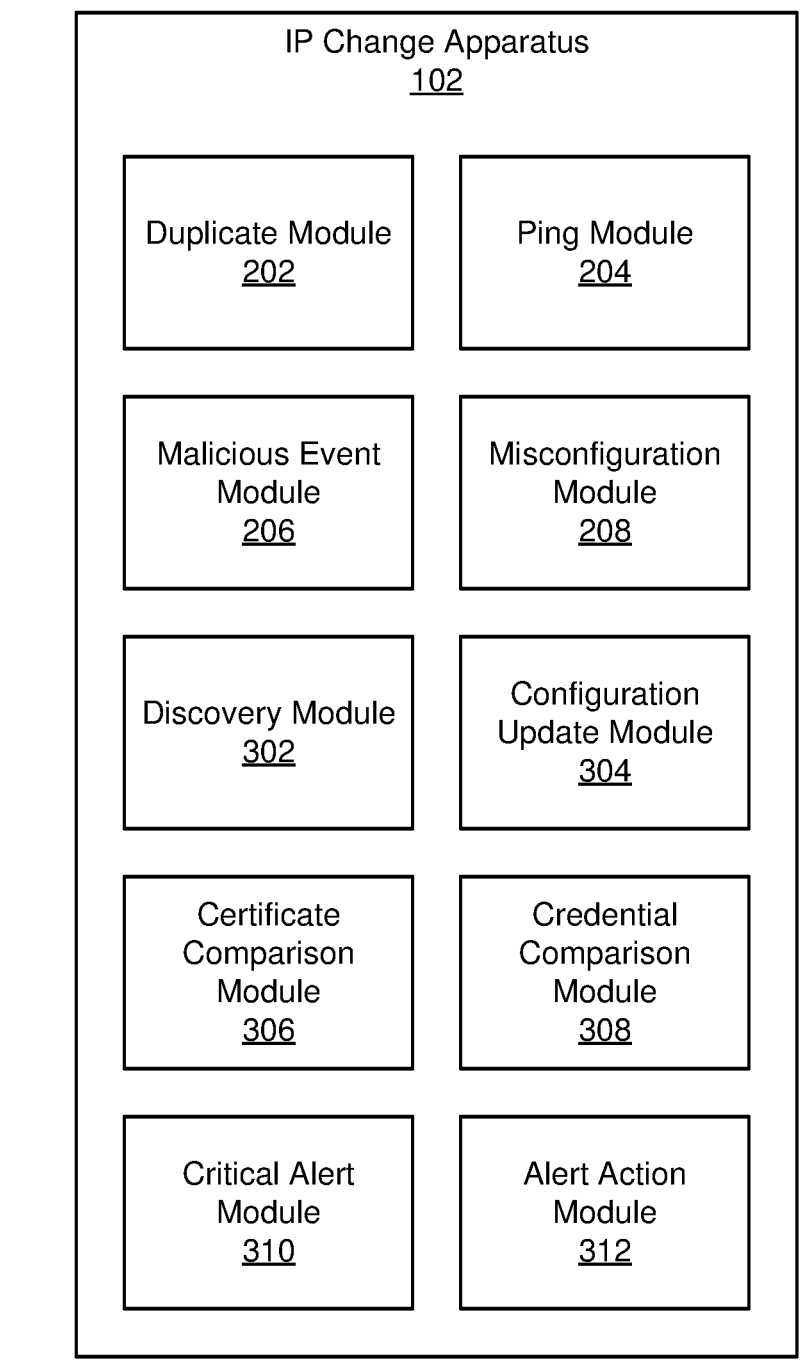
FIG. 3 is a schematic block diagram illustrating another apparatus for detecting identity theft or identity change in managed computing systems, according to various embodiments.

FIG. 3 is a schematic block diagram illustrating another apparatus 300 for detecting identity theft or identity change in managed computing systems, according to various embodiments. The apparatus 300 includes an IP change apparatus 102 with a duplicate module 202, a ping module 204, a malicious event module 206, and a misconfiguration module 208, which are substantially similar to those described above with regards to the apparatus 200 of FIG. 2. In various embodiments, the apparatus 300 includes a discovery module 302, a configuration update module 304, a certificate comparison module 306, a credential comparison module 308, a critical alert module 310, and/or an alert action module 312, which are described below. The apparatus 300 of FIG. 3 may be implemented similar to the apparatus 200 of FIG. 2.

In some embodiments, the apparatus 300 includes a discovery module 302 configured to initiate discovery of computing devices of a computing system, such as the computing system 100 of FIG. 1. In some embodiments, the discovery module 302 uses SSDP, SLP, or a similar discovery service. In other embodiments, the discovery module 302 controls a discovery service to initiate discovery of computing devices. In other embodiments, the discovery module 302 supplements a running discovery service and works in conjunction with the duplicate module 202. In other embodiments, the discovery module 302 initiates discovery based on events in the system 100, such as communication errors. One of skill in the art will recognize other ways for the discovery module 302 to initiation discovery, reasons to initiate discovery, and/or coordinate with the duplicate module 202 and/or the IP change apparatus 102.

In some embodiments, the apparatus 300 includes a configuration update module 304 configured to determine that the second computing device is the first computing device and to remove the first IP address being assigned to the first computing device in response to receiving confirmation from a user that the first computing device is assigned the second IP address. In some embodiments, the user is a system administrator. In some examples, the user/system administrator sends the confirmation in response to the alert of a possible misconfiguration. In some embodiments, the response from the user is a confirmation that the second IP address was assigned to the first computing device, which triggers the configuration update module 304 to remove the first IP address from being assigned to the first computing device.

In other embodiments, determine that the second computing device is the first computing device includes the configuration update module 304 removing duplicate entries in a routing table or other data structure that records unique identifiers of computing devices and correlates the computing devices with IP addresses. In other embodiments, the user is an application that confirms that the second IP address was assigned to the first computing device. One of skill in the art will recognize other messages from a user that are a confirmation that the second IP address has been assigned to the first computing device and other actions to remove the first IP address being assigned to the first computing device.

The apparatus 300, in some embodiments, includes a certificate comparison module 306 configured to, in response to a failure to receive a response to the test message, determine if a digital certificate of the second computing device matches a digital certificate of the first computing device. In the embodiments, the malicious event module 206 is further configured to send an alert of a possible malicious event in response to determining that the digital certificate of the second computing device does not match the digital certificate for the first computing device.

In some embodiments, the certificate comparison module 306 includes a private key and the digital certificates of the first and second computing devices are encrypted with a public key. The certificate comparison module 306 uses the private key to unencrypt a digital certificate of the first computing device and the unencrypt a digital certificate of the second computing device prior to comparing the digital certificates of the first and second computing devices. In response to the certificate comparison module 306 determining that the unencrypted digital certificates of the first and second computing devices do not match, the malicious event module 206 sends the alert of a possible malicious event.

In other embodiments, the certificate comparison module 306 determines that the first computing device has a valid digital certificate and determines that the second computing device either does not have a digital certificate or that the second computing device has an invalid digital certificate. The malicious event module 206, in some embodiments, in response to the first computing device having a valid digital certificate and the second computing device not having a digital certificate or not having a valid digital certificate sends the alert of a possible malicious event. One of skill in the art will recognize other ways for the certificate comparison module 306 compare digital certificates of the first and second computing devices, check validity of the digital certificate of the second computing device, etc. to determine if the first computing device is the second computing device.

In some embodiments, in response to the certificate comparison module 306 determining that the digital certificate of the second computing device matches the digital certificate of the first computing device, the misconfiguration module 208 is further configured to send an alert of a possible misconfiguration. The configuration update module 304 may then act based on a response from a user as described above.

In some embodiments, the apparatus 300 includes a credential comparison module 308 configured to, in response to determining that the digital certificate of the second computing device matches the digital certificate for the first computing device, determine whether credentials of the second computing device match credentials of the first computing device. In the embodiments, the apparatus 300 includes a critical alert module 310 configured to send an alert warning of a malicious event regarding the second computing device in response to determining that credentials of the second computing device do not match credentials of the first computing device.

Often passwords are hashed before being transmitted for comparison so that the password itself is not transmitted, which provides a level of security. The credential comparison module 308, in some embodiments, determines whether credentials of the second computing device match credentials of the first computing device by determining that a username of the first and second computing devices match and by comparing a hash of a password of the first computing device with a hash of a password of the second computing device. In other embodiments, the username is also hashed and the credential comparison module 308 compares hashes of the usernames.

The username and password of the first and second computing devices, in some embodiments, are used for the first and second computing devices to communicate with other computing devices, for example when communicating using an application programming interface ("API"). In other embodiments, username and password of the first and second computing devices are for a user to log into the first and second computing devices. Where the credentials of the first and second computing devices do not match, often this is a more sure sign of a critical malicious event which warrants the critical alert module 310 sending the alert warning of a malicious event regarding the second computing device. In some embodiments, the critical alert module 310 sends an alert that is a critical alert that may be viewed as a higher priority alert, an alert that requires immediate action, or the like.

In some embodiments, the misconfiguration module 208 is further configured to send an alert of a possible misconfiguration in response to the credential comparison module 308 determining that credentials of the first and second computing devices match. The configuration update module 304 may take action to remove the association of the first IP address with the first computing device based on a response from a user to the alert of the possible misconfiguration.

In some embodiments, the apparatus 300 includes an alert action module 312 configured to initiate a preventative action limiting communication to and from the second computing device in response to receiving a response to the test message to the first IP address, in response to the certificate comparison module 306 determining that the digital certificates of the first and second computing devices do not match, and/or in response to the credential comparison module 308 determining that the credentials of the first and second computing devices do not match. The action taken by the alert action module 312, in various embodiments, includes temporarily suspending communications with the second computing device, halting communication to the second IP address, isolating the second computing device, or the like.

In some embodiments, actions taken by the alert action module 312 are temporary pending an action by a system administrator, a user, etc. In some embodiments, the actions taken by the alert action module 312 are intended to protect the system 100 where the first and second computing devices operate. One of skill in the art will recognize other ways for the alert action module 312 to take action to protect the system 100 where the first and second computing devices operate.

Figure 4:
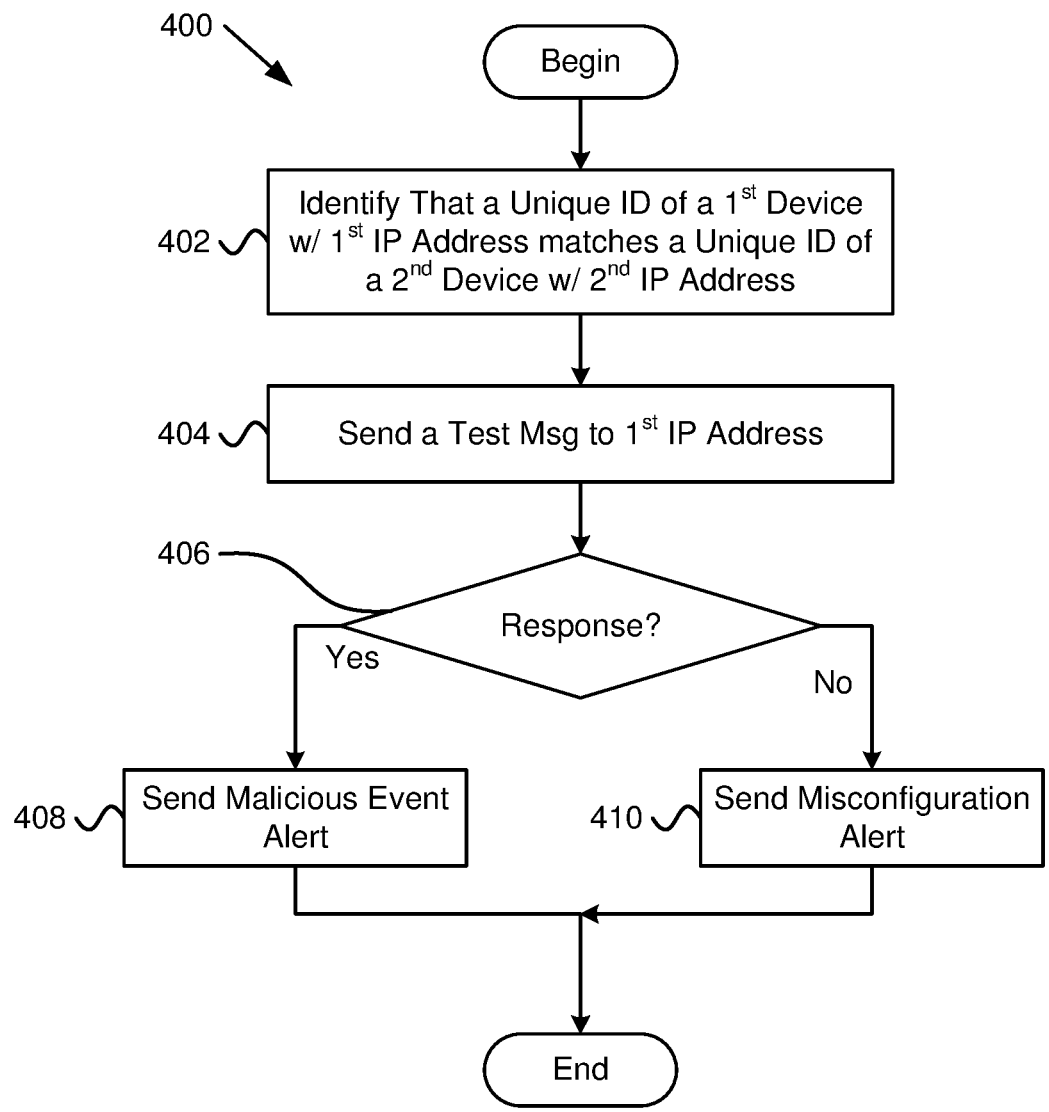
FIG. 4 is a schematic flow chart diagram illustrating a method for detecting identity theft or identity change in managed computing systems, according to various embodiments.

FIG. 4 is a schematic flow chart diagram illustrating a method 400 for detecting identity theft or identity change in managed computing systems, according to various embodiments. The method 400 begins and identifies 402 that a unique identifier of a first computing device assigned a first IP address matches a unique identifier of a second computing device assigned a second IP address and, in response, sends 404 a test message to the first computing device using the first IP address.

The method 400 determines 406 whether a response to the test message is received. If the method 400 determines 406 that a response to the test message has been received, the method 400 sends 408 an alert of a possible malicious event, and the method 400 ends. If the method 400 determines 406 that a response to the test message has not been received, the method 400 sends 410 an alert of a possible misconfiguration, and the method 400 ends. In various embodiments, all or a portion of the method 400 is implemented by the duplicate module 202, the ping module 204, the malicious event module 206, and/or the misconfiguration module 208.

Figure 5:
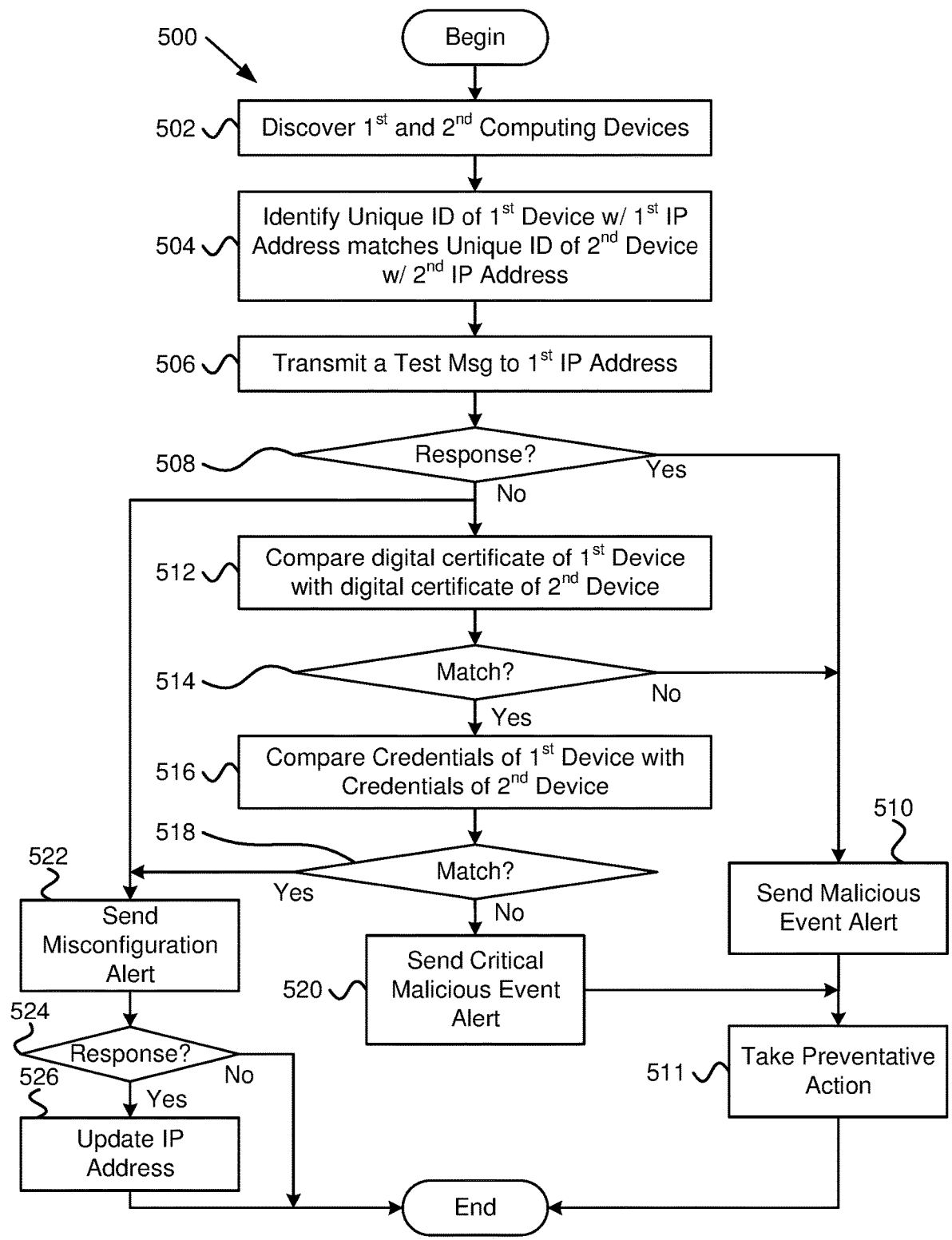
FIG. 5 is a schematic flow chart diagram illustrating another method for detecting identity theft or identity change in managed computing systems, according to various embodiments.

FIG. 5 is a schematic flow chart diagram illustrating another method 500 for detecting identity theft or identity change in managed computing systems, according to various embodiments. The method 500 begins and discovers 502 a first computing device with a first IP address and a second computing device with a second IP address and identifies 504 that a unique identifier of the first computing device matches a unique identifier of the second computing device, and in response, transmits a test message the first IP address.

The method 500 determines 508 whether there is a response to the test message. If the method 500 determines 508 that there is a response to the test message, the method 500 sends 510 an alert of a possible malicious event, and the method 500 ends. If the method 500 determines 508 that there is not a response to the test message to the first IP address, the method 500 compares a digital certificate of the first computing device with a digital certificate of the second computing device and determines 514 whether there is a match between the digital certificates of the first and second computing device. If the method 500 determines 514 that there not a match between the digital certificates of the first and second computing devices, the method 500 sends 510 an alert of a possible malicious event, takes 511 preventative action to limit communication to and from the second IP address, and the method 500 ends.

If the method 500 determines 514 that there is a match between the digital certificates of the first and second computing devices, the method 500 compares credentials of the first computing device and the second computing device and determines 518 whether there is a match between the credentials of the first and second computing devices. If the method 500 determines that there is not a match between the credentials of the first and second computing devices, the method 500 sends 520 a critical malicious event alert, takes 511 preventative action to limit communication to and from the second IP address, and the method 500 ends.

If the method 500 determines 508 that there is not a response to the test message, the method 500 also sends 522 an alert that there is a possible misconfiguration. Also, if the method 500 determines 518 that there is a match between the credentials of the first and second computing devices, the method 500 sends 522 an alert that there is a possible misconfiguration. The method 500 determines 524 whether there is a response to the alert of the possible misconfiguration. If the method 500 determines 524 that there is no response to the alert of a possible misconfiguration, the method 500 ends.

If the method 500 determines 524 that there is a response to the alert of a possible misconfiguration indicating a misconfiguration, the method 500 updates 526 a router table or the like removing the first IP address being associated with the first computing device, and the method 500 ends. In various embodiments, all or a portion of the method 500 is implemented by the duplicate module 202, the ping module 204, the malicious event module 206, the misconfiguration module 208, the discovery module 302, the configuration update module 304, the certificate comparison module 306, the credential comparison module 308, the critical alert module 310, and/or the alert action module 312.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
identifying that a unique identifier of a first computing device assigned a first internet protocol ("IP") address matches a unique identifier of a second computing device assigned a second IP address by comparing a serial number of the second computing device with a serial number of the first computing device, and/or by comparing a universal unique identifier ("UUID") of the second computing device with a UUID of the first computing device;
in response to identifying that the unique identifier of the first computing device matches the unique identifier of the second computing device, sending a test message to the first computing device using the first IP address;

sending an alert that the second computing device is a possible malicious clone of the first computing device in response to receiving a response to the test message; and sending an alert of a possible misconfiguration in response to a failure to receive a response to the test message.

2. The method of claim 1, further comprising determining that the second computing device is the first computing device and removing the first IP address being assigned to the first computing device in response to receiving confirmation from a user that the first computing device is assigned the second IP address.

3. The method of claim 1, further comprising:
in response to a failure to receive a response to the test message, determining whether a digital certificate of the second computing device matches a digital certificate of the first computing device; and
in response to determining that the digital certificate of the second computing device does not match the digital certificate for the first computing device, sending an alert of a possible malicious event.

4. The method of claim 3, further comprising:
in response to determining that the digital certificate of the second computing device matches the digital certificate for the first computing device, determining whether credentials of the second computing device match credentials of the first computing device; and
in response to determining that credentials of the second computing device do not match credentials of the first computing device, sending an alert warning of a malicious event regarding the second computing device.

5. The method of claim 4, further comprising:
in response to determining that credentials of the second computing device match credentials of the first computing device, sending an alert of a possible misconfiguration; and
determining that the second computing device is the first computing device and removing the first IP address being assigned to the first computing device in response to receiving confirmation from a user that the first computing device is assigned the second IP address.

6. The method of claim 4, wherein the credentials of the first computing device and the credentials of the second computing device each comprise an identifier and a corresponding password.

7. An apparatus comprising:
a processor; and
non-transitory computer readable storage media storing code, the code being executable by the processor to perform operations comprising:
identifying that a unique identifier of a first computing device assigned a first internet protocol ("IP") address matches a unique identifier of a second computing device assigned a second IP address by comparing a serial number of the second computing device with a serial number of the first computing device, and/or by comparing a universal unique identifier ("UUID") of the second computing device with a UUID of the first computing device;
in response to identifying that the unique identifier of the first computing device matches the unique identifier of the second computing device, sending a test message to the first computing device using the first IP address;

sending an alert that the second computing device is a possible malicious clone of the first computing device in response to receiving a response to the test message; and sending an alert of a possible misconfiguration in response to a failure to receive a response to the test message.

8. The apparatus of claim 7, the operations further comprising determining that the second computing device is the first computing device and removing the first IP address being assigned to the first computing device in response to receiving confirmation from a user that the first computing device is assigned the second IP address.

9. The apparatus of claim 7, the operations further comprising:
in response to a failure to receive a response to the test message, determining whether a digital certificate of the second computing device matches a digital certificate of the first computing device; and
in response to determining that the digital certificate of the second computing device does not match the digital certificate for the first computing device, sending an alert of a possible malicious event.

10. The apparatus of claim 9, the operations further comprising:
in response to determining that the digital certificate of the second computing device matches the digital certificate for the first computing device, determining whether credentials of the second computing device match credentials of the first computing device; and
in response to determining that credentials of the second computing device do not match credentials of the first computing device, sending an alert warning of a malicious event regarding the second computing device.

11. The apparatus of claim 10, the operations further comprising:
in response to determining that credentials of the second computing device match credentials of the first computing device, sending an alert of a possible misconfiguration; and
determining that the second computing device is the first computing device and removing the first IP address being assigned to the first computing device in response to receiving confirmation from a user that the first computing device is assigned the second IP address.

12. A non-transitory computer readable storage medium storing code, the code being configured to be executable by a processor to perform operations comprising:
identifying that a unique identifier of a first computing device assigned a first internet protocol ("IP") address matches a unique identifier of a second computing device assigned a second IP address by comparing a serial number of the second computing device with a serial number of the first computing device, and/or by comparing a universal unique identifier ("UUID") of the second computing device with a UUID of the first computing device;
in response to identifying that the unique identifier of the first computing device matches the unique identifier of the second computing device, sending a test message to the first computing device using the first IP address;
sending an alert that the second computing device is a possible malicious clone of the first computing device in response to receiving a response to the test message; and sending an alert of a possible misconfiguration in response to a failure to receive a response to the test message.

13. The computer readable storage medium of claim 12, the operations further comprising determining that the second computing device is the first computing device and removing the first IP address being assigned to the first computing device in response to receiving confirmation from a user that the first computing device is assigned the second IP address.

14. The computer readable storage medium of claim 12, the operations further comprising:
   in response to a failure to receive a response to the test message, determining whether a digital certificate of the second computing device matches a digital certificate of the first computing device; and
   in response to determining that the digital certificate of the second computing device does not match the digital certificate for the first computing device, sending an alert of a possible malicious event.

15. The computer readable storage medium of claim 14, the operations further comprising:
   in response to determining that the digital certificate of the second computing device matches the digital certificate for the first computing device, determining whether credentials of the second computing device match credentials of the first computing device; and
   in response to determining that credentials of the second computing device do not match credentials of the first computing device, sending an alert warning of a malicious event regarding the second computing device.

16. The computer readable storage medium of claim 15, the operations further comprising:
   in response to determining that credentials of the second computing device match credentials of the first computing device, sending an alert of a possible misconfiguration; and
   determining that the second computing device is the first computing device and removing the first IP address being assigned to the first computing device in response to receiving confirmation from a user that the first computing device is assigned the second IP address.

\* \* \* \* \*